US012316483B2

(12) United States Patent
Tierno et al.

(10) Patent No.: US 12,316,483 B2
(45) Date of Patent: May 27, 2025

(54) ENCODING AND DECODING FOR PAM TRANSMITTER AND RECEIVER

(71) Applicant: Apple Inc., Cupertino, CA (US)

(72) Inventors: Jose A. Tierno, Palo Alto, CA (US);
Sanjeev S. Gokhale, Austin, TX (US);
Sunil Bhosekar, Austin, TX (US);
William D. Schwarz, Austin, TX (US)

(73) Assignee: Apple Inc., Cupertino, CA (US)

(*) Notice: Subject to any disclaimer, the term of this patent is extended or adjusted under 35 U.S.C. 154(b) by 98 days.

(21) Appl. No.: 17/932,991

(22) Filed: Sep. 16, 2022

(65) Prior Publication Data
US 2024/0097877 A1  Mar. 21, 2024

(51) Int. Cl.
*H04L 25/49* (2006.01)
(52) U.S. Cl.
CPC ................. *H04L 25/4917* (2013.01)
(58) Field of Classification Search
CPC ... H04L 25/4917; H04L 25/4908; H03K 7/02; H03K 9/02; H04B 14/023
See application file for complete search history.

(56) References Cited

U.S. PATENT DOCUMENTS

| | | | |
|---|---|---|---|
| 6,362,757 B1* | 3/2002 | Lee | H03M 7/20 341/59 |
| 7,113,550 B2 | 9/2006 | Stonecypher et al. | |
| 8,121,200 B2 | 2/2012 | Zheng | |
| 9,191,251 B2* | 11/2015 | Shibata | H04L 25/4919 |
| 9,942,063 B2* | 4/2018 | Mendel | H04L 25/08 |
| 11,038,726 B2* | 6/2021 | Greiss | H04L 25/4917 |
| 11,146,430 B1* | 10/2021 | Lee | H04L 25/4917 |
| 2020/0212943 A1 | 7/2020 | Banin et al. | |

* cited by examiner

*Primary Examiner* — Betsy Deppe
(74) *Attorney, Agent, or Firm* — Kowert, Hood, Munyon, Rankin & Goetzel, P.C.; Dean M. Munyon

(57) ABSTRACT

An encoding/decoding scheme for pulse amplitude modulation (PAM) communications systems is disclosed. In one embodiment, a transmitter unit includes an encoder circuit and a transmit circuit. The encoder circuit is configured to encode an input data word having a first number of bits into a output data word having a second number of bits. The encoder performs a comparison operation to determine if at least one pair of subsets of the second plurality of bits includes bit values that are complements of each other. The encoder is further configured to modify the second plurality of bits if none of the pairs of subsets includes bit values that are complements of each other such that the modified second plurality of bits does include at least one pair of subsets that includes values complementary to one another.

20 Claims, 11 Drawing Sheets

ENCODING AND DECODING FOR PAM TRANSMITTER AND RECEIVER

BACKGROUND

Technical Field

This disclosure is directed to communications systems, and more particularly, encoding mechanisms in communications systems.

Description of the Related Art

High-speed links utilizing serializers-deserializers (SERDES) are commonly used in modern communications systems. These types of systems use various encoding schemes, some of which embed a clock signal in a serial-data stream that is conveyed from a transmitter to a receiver. On the receiver side of the communications, a clock and data recovery (CDR) circuit recovers the clock signal and the data, using the former to synchronize the latter.

In order for a CDR circuit to function properly, the incoming data may be sent in a manner to include a certain number of transitions. For example, in a simple, binary data stream (1's and 0's), the data stream may include a certain number of transitions between the two logic values to enable recovery of the clock and the data.

SUMMARY

An encoding/decoding scheme for pulse amplitude modulation (PAM) communications systems is disclosed. In one embodiment, a transmitter unit includes an encoder circuit and a transmit circuit. The encoder circuit is configured to encode an input data word having a first number of bits into an output data word having a second number of bits. The encoder performs a comparison operation to determine if at least one pair of subsets of the second plurality of bits includes bit values that are complements of each other. The encoder is further configured to modify the second plurality of bits if none of the pairs of subsets includes bit values that are complements of each other such that the modified second plurality of bits does include at least one pair of subsets that includes values complementary to one another.

In one embodiment, the encoder circuit includes first and second most significant bit (MSB) encoders and first and second least significant bit (LSB) encoders. The encoding includes encoding a subset of MSBs of the input data word using first and second MSB encoders, and further includes encoding a subset of LSBs of the input data word using first and second LSB decoders. A transition checker is configured to check the encodings generated by the MSB and LSB encoders, and selects, as the transmit data word, an encoding that includes at least one complementary (also referred to as "symmetric") transition. However, a limited set of input words are such that even after encoding with the MSB and LSB encoders will still not result in a complementary transition in the resulting word when encoded. Accordingly, various embodiments also include a lookup table. When an input data word is received, it is checked to see if it is one of the limited set of input words, stored in the lookup table. If so, the lookup table provides a corresponding substitute word for use as the transmit word, wherein the substitute word includes at least one complementary transition.

The present disclosure also contemplates a receiver that may be coupled to the transmitter via a communications channel. The receiver circuit includes a lookup table and pairs of MSB and LSB decoders that correspond to the MSB and LSB encoders, respectively, of the transmitter. The receiver also includes a lookup table. If the data word received from the transmitter corresponds to a substitute word provided from the transmitter lookup table, the output data word from the receiver is provided by the lookup table. Otherwise, the output word is provided from the MSB and LSB decoders.

BRIEF DESCRIPTION OF THE DRAWINGS

The following detailed description makes reference to the accompanying drawings, which are now briefly described.

DETAILED DESCRIPTION OF EMBODIMENTS

Figure 1A:
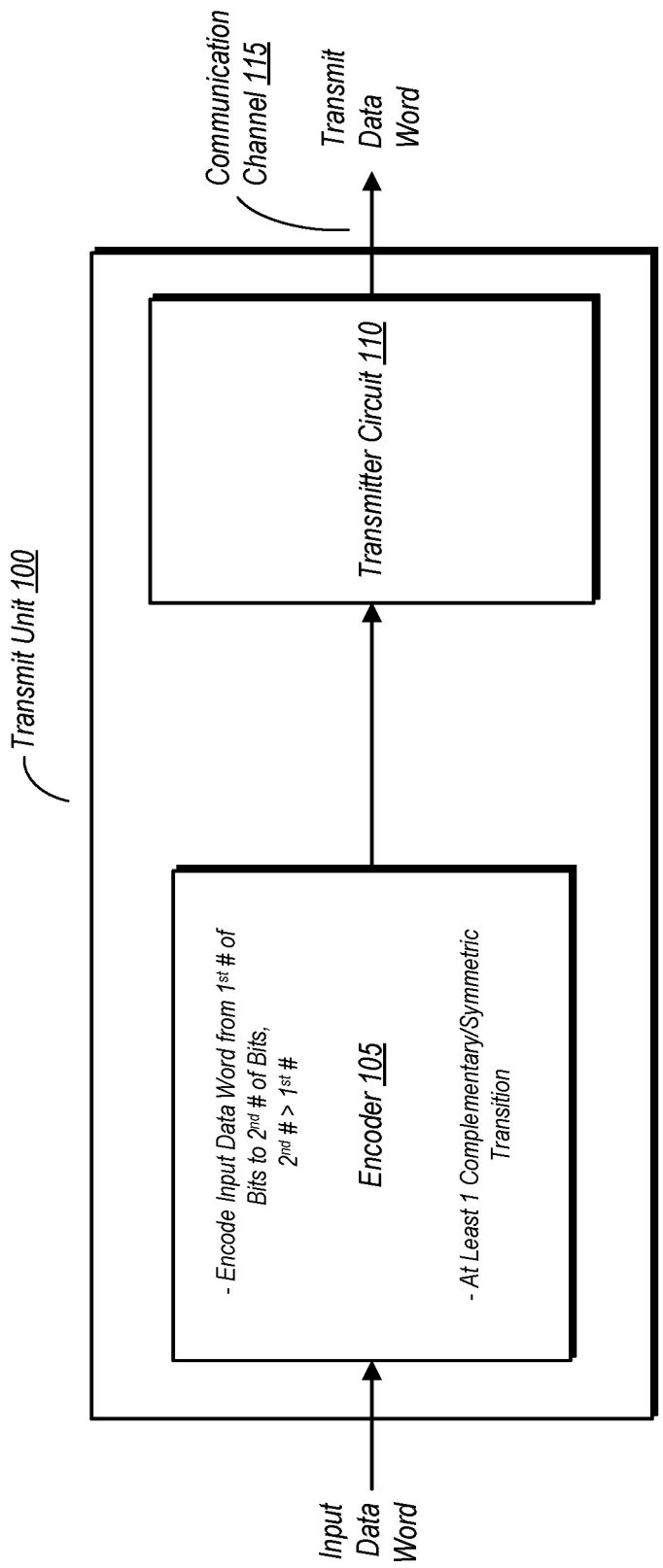
FIG. 1A is a block diagram of one embodiment of a transmitter circuit.

An encoding/decoding scheme for PAM communications systems is disclosed. CDR (Clock and data recovery) circuits need to observe relatively frequent transitions (e.g., 0 to 1, 1 to 0) in the data in order to reliably recover both the clock and the data. The difference between the number of 1's and 0's in a unit of data is referred to as a disparity, and it is desirable to keep the disparity bounded in order to achieve the number of transitions required to recover the clock and data. One mechanism for achieving this is certain encoding schemes, such as the 8b/10b scheme in which 8 data bits are encoded into 10 bits and the run length of consecutive 0's or 1's is limited to 5. 8b/10b works well with some types of transmission encoding schemes, such as NRZ (non-return to zero) since there are two voltage levels and thus any transition between the two is symmetric. The 8b/10b encoding scheme may be less effective with encoding schemes such as PAM4 and others that have more than two voltage levels.

A symmetric transition is defined herein as a transition in which the signal crosses a midpoint voltage of the possible voltage range. A symmetric transition is further defined, in some encoding/decoding schemes, as a transition in which the magnitude of the transition is substantially equal on both sides of the midpoint voltage. From a logic value standpoint, a symmetric transition includes a transition from one set of bits to another set of complementary bits. For example, if two-bit symbols are used, a transition from a value of 01 to a value of 10 constitutes a symmetric (and complementary) transition.

The demand for higher data rates has resulted in schemes such as PAM4, which has four voltage levels, with each voltage level representing a two-bit value. However, transitions between different values of 1's and 0's in PAM4 does not always result in a symmetric transition with some encoding schemes, such as the 8b/10b. As noted above, it is desirable to keep the disparity bounded to ensure a number of transitions that enable recovery of the clock and data. In a PAM4 system, with four voltage levels, it is further desirable to ensure a number of symmetric transitions. However, there are some transitions that are not symmetric in an 8b/10b scheme when used with encoding such as PAM4.

The present disclosure makes use of the insight that encoding schemes can be used to ensure that symmetric transitions occur in a transmitted data word. In one embodiment, a transmitter includes an encoder configured to encode an input data word that includes a first plurality of bits to an output data word that include a second plurality of bits, wherein a first number of bits included in the first plurality of bits is less than a second number of bits included in the second plurality of bits. The encoder is further configured to compare corresponding bit values between different subsets of a plurality of subsets of the second plurality of bits. In response to a determination that the plurality of subsets does not include at least one pair of subsets whose bit values are complements of each other, the encoder modify the plurality of subsets to include a particular subset whose bit values are a complement of at least one other subset of the plurality of subsets. The encoder in various embodiments includes one or more MSB encoders and one or more LSB encoders that encode an input data word to obtain a transmit data word that includes at least one symmetric transition. A receiver may include corresponding MSB and LSB decoders.

The present disclosure also makes use of the insight that there is a finite number of words that will not have a symmetric transition when using an encoding scheme of 8b/10b with a modulation scheme such as PAM4. In various embodiments, a communications using a modulation scheme such as PAM4, substitute codes are used for those in words which a symmetric transition does not occur even after encoding with, e.g., 8b/10b encoders. On an encoder side, a transition checker examines the incoming code to determine if it is one of the codes for which a symmetric transition does not occur. If so, a substitute code is provided from a lookup table, with the substitute code being transmitted across the communications link. On the receiver side, another unit examines the incoming code to determine if it is the substitute code. If the incoming code is a known substitute code, the original code (prior to encoding on the transmit side) is obtained from another lookup table and provided as the receiver output.

The discussion below begins with a description of various hardware/circuit embodiments that may implement various portions of a communications system that implement the encoding and decoding schemes as disclosed herein. These hardware/circuit embodiments include both transmitters and receivers and various circuit units implemented therein. Various method embodiments for operating these units are then discussed. A description of various system embodiments in which a communications system may be implemented are also discussed, with the communications system utilizing various portions of the circuits/hardware disclosed herein.

Communications System Components:

FIG. 1A is a block diagram of one embodiment of a transmitter. In the embodiment shown, transmit unit 100 implements circuitry for an encoder 105 and a transmitter circuit 110. Encoder 105 in the embodiment shown is configured to receive an input data word from a source external thereto. For example, the input data word could be provided by a general purpose processor circuit that communicates with other devices at the other end of a communications link.

Encoder 105 in the embodiment shown implements circuitry for encoding incoming data words for serial transmission. The serial transmissions may include an embedded clock signal, and it is thus desirable to have a certain number of logical transitions to ensure that the clock signal can be recovered on the receiver side of the link. More particularly, at least some of the logical transitions are to be symmetrical transitions as defined above. In one embodiment, this is accomplished by utilizing 8b/10b encoding, wherein a group of eight bits is mapped by the encoder onto a group of ten bits in an attempt to induce or ensure that the group of bits includes at least one complementary/symmetric transition. The encoding scheme may also be intended to keep the disparity within specified bounds.

In some transmission schemes, encoding schemes such as 8b/10b encoding does not always ensure the presence of a symmetrical transition even after encoding. For example, in PAM4 systems (which includes four voltage levels, each of which represents two bits), there are signal combinations that do not result in at least one symmetrical transition even after 8b/10b encoding. An encoding scheme for ensuring at least one symmetrical transition when one of these combinations is received is discussed in further detail below.

The encoded information is provided from encoder 105 to transmitter circuit 110, generates the final signals for transmission. Transmitter circuit 110 in the embodiment shown may include various types of circuitry used in the transmission of information. Such circuitry may include amplifiers, filters and so on. In some embodiments, transmitter circuit 110 may also include serialization circuits to serialize data received in parallel from encoder 105. However, embodiments are also possible and contemplated in which serialization is performed in encoder 105. The symbols received by transmitter circuit 100 may then be transmitted onto communication channel 115. In various embodiments, the symbols are transmitted in serial.

Figure 1B:
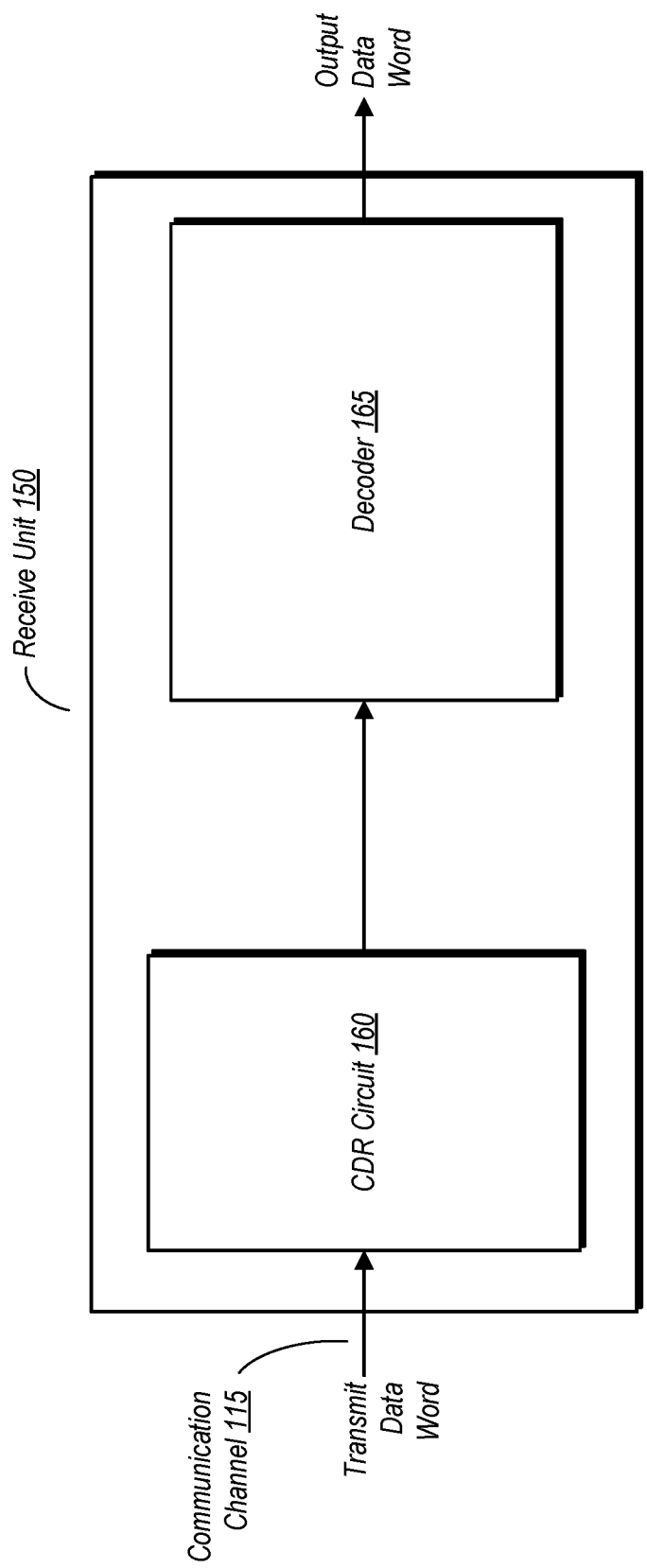
FIG. 1B is a block diagram of one embodiment of a receiver circuit.

FIG. 1B is a block diagram of a receive unit of a communications system that also includes transmit unit 100. In the embodiment shown, receive unit 150 includes a clock-and-data recovery (CDR) circuit 160, configured to receive symbols transmitted via communication channel 115. The symbols are transmitted in serial in this embodiment, and include a clock signal embedded therein. CDR circuit 160 in the embodiment shown recovers both the transmitted symbols and an embedded clock signal. The recovered symbols in this embodiment are the encoded symbols as transmitted by transmit unit 100. CDR circuit 160 may include circuits such as phase-locked loops, oscillators, decision feedback equalization circuitry, and so on. The output from CDR 160 in the embodiment shown is a stream of data symbols, still encoded as performed on the transmit side of the link, synchronized to the recovered clock signal.

Decoder 165 in the embodiment shown is configured to perform decoding to recover the original data symbols (e.g., prior to encoding on the transmit side). For example, if the encoding on the transmit side was 8b/10b encoding, decoder 165 recovers the original eight bits. As will further be discussed below, decoder 165 may include a lookup table for decoding of certain bit combinations where the original encoding on the transmit side does not produce a sufficient number of symmetrical transitions for clock recovery.

In addition to performing decoding functions, decoder 165 may also perform other operations, such as data formatting and serial-to-parallel conversion. Thereafter, an output data word may be provided by decoder 165 to, e.g., other circuitry, such as post-processing circuitry that prepares the information for a user interface.

Figure 2A:
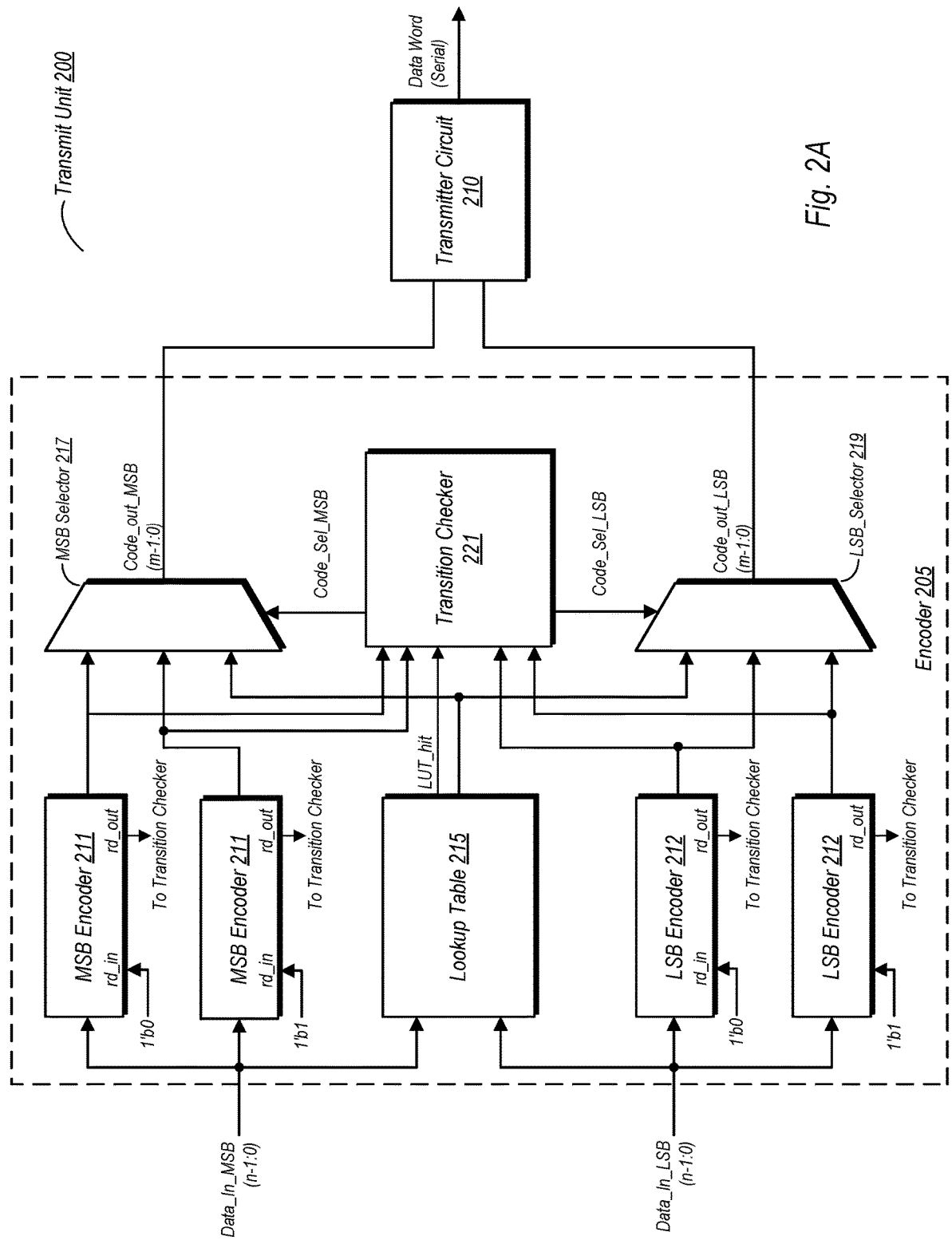
FIG. 2A is a block diagram of one embodiment of a transmitter circuit.

FIG. 2A is a block diagram of one embodiment of a transmit circuit. In the embodiment shown, transmit unit 200 includes both an encoder circuit 205 and a transmitter circuit 210. An input data word having 2n bits (where n is an integer number) in the embodiment shown is received in this particular embodiment as n most significant bits (Data_In_MSB n−1:0) and n least significant bits (Data_In_LSB n−1:0).

The MSB data in the embodiment shown is provided to two separate MSB encoders 211, while the LSB data is provided to two separate LSB encoders. A first one of the MSB encoders 211 includes a hardwired input (rd_in, hardwired to 1'b0) to adjust the encoding toward a positive running disparity, while a second one of the MSB encoders 211 includes a hardwired input (rd_in, hardwired to 1'b1) to adjust the encoding toward a negative running disparity. Both of the LSB encoders 212 are similarly arranged. Each of the encoders includes an output, rd_out, which indicates the resultant running disparity by the encoding performed therein.

In one embodiment, the MSB encoders 211 and LSB encoders 212 include circuitry that implements 8B/10b encoders, receiving 8-bit input data (e.g., 8 bits of MSB data and 8 bits of LSB data) and encoding that to 10-bit output data. However, the disclosure is not limited to this type of encoding, as other types are possible and contemplated.

Encoder 205 in the embodiment shown also includes a lookup table 215, which is coupled to receive both the MSB input data and the LSB input data. Lookup table 215 is used for certain data input words under certain signaling/modulation schemes that do not result in at least one symmetrical transition even after encoding. For example, in systems that use PAM4 modulation, there are certain data bytes for which there is no symmetrical transition even after encoding using the 8b/10b encoding scheme. Furthermore, 8b/10b encoding does not use all possible 10-bit codes for corresponding 8-bit combinations. That is, there are some 10-bit combinations that never result from performing 8b/10b encoding on the 8-bit input data. Lookup table 215 in the embodiment shown may map the 8-bit codes that lack a symmetrical transition to the 10-bit codes that would otherwise never result from 8b/10b encoding. The 10-bit codes used as a substitute include at least one symmetrical transition, and are thus substituted for corresponding 10-bit codes that do not include a symmetrical transition. This substitution effectively induces at least one symmetrical transition in the data to be transmitted, thereby enabling clock recovery at the receiver.

Lookup table 215 in the embodiment shown includes logic circuitry configured to detect whether either the MSB data or LSB data includes one of the data bytes described in the previous paragraph. In response to the detection of one of these bytes, the logic circuitry in lookup table 215 indicates a hit by causing assertion of the LUT signal. Lookup table 215 also include memory circuitry (e.g., content addressable memory circuits) configured to store both the data words and corresponding substitute encoding when the former would not otherwise produce at least one symmetric transition after encoding. If a hit is detected, lookup table 215 may provide substitute codes for the MSB and LSB data. In one embodiment, when a hit is detect, the code is provided for the LSB data, while the substitution of MSB data is determine by the values of the MSB and LSB data as received by encoder 205. If Data_In_MSB is >Data_In_LSB, the MSB output code is set to the binary equivalent of 0x2AA. Otherwise, if Data_In_MSB is <Data_In_LSB, the output is set to 0x155. It is noted that these values are provided by way of example for this particular embodiment, and are not intended to limit the disclosure in any way. The substitute MSB output codes may be used by a decoder in the receiver to recover the ordering of data upon receipt therein.

Encoder 205 in the embodiment shown also includes a transition checker 221, MSB selector 217, and LSB selector 219. Transition checker 221 in the embodiment shown implements logic circuitry that generates selection signals for MSB selector 217 and LSB selector 219. The MSB selector 217 and LSB selector 219 implement circuitry to provide output values Code_out_MSB and Code_out_LSB. Each of these codes is an m-bit value, where m>n. For example, in the embodiments that utilize 8b/10b encoding, n=8 while m=10. Transition checker 221 in the embodiment shown generates the selection signals, Code_Sel_MSB and Code_Sel_LSB, for MSB selector 217 and LSB selector 219, respectively. The selections depend on the values produced by MSB encoders 211, LSB encoders 212, and whether a hit is detected by lookup table 215.

If a hit is detected by lookup table 215, the LUT_hit signal is asserted. In response to assertion of the LUT_hit signal, transition checker 221 generates selection signals to select the substitute values provided from lookup table 215 to be provided as the Code_out_MSB and Code_out_LSB values. If a hit is not detected in lookup table 215, transition checker 221 determines which of the MSB encoders 211 and LSB encoders 212 from which to provide the MSB and LSB output values, respectively. Since, in this embodiment, there are four possible output combinations from among MSB encoders 211 and LSB encoders 212, transition checker 221 performs a check of these different combinations to determine which pairing to use. If only one of the four possible output combinations includes a symmetric transition, then that combination of is the one selected. If more than one output combination includes a symmetric transition, transition checker 221 uses the running disparities indicated via the rd_out outputs of each of the encoders, and causes selection of the output combination that best adjusts the running disparity toward zero. For example, consider the case where one of the MSB encoders 211 outputs a running disparity of −1, a second MSB encoder 211 outputs a running disparity of −3, a first LSB encoder 212 outputs a running disparity of +1 and the second LSB encoder outputs a running disparity of +2. In such a situation, transition checker 221 selects the first MSB encoder 211 (running disparity −1) and the first LSB encoder 212 (running disparity of +1), as their aggregate running disparity is zero, whereas the other possible combinations produce aggregate running disparities of +1, −1, and −2.

Based on selection signals generated by transition checker 221, Code_out_MSB and Code_out_LSB are provided to transmitter circuit 210. In the embodiment shown, transmitter circuit 210 may perform serialization of the received data. Transmitter circuit 210 may also include amplifier, filters and any other circuitry that is used to transmit information onto a communications channel. Accordingly, data words comprising the MSB and LSB codes generated in encoder 205 are thus transmitted as serial data.

Figure 2B:
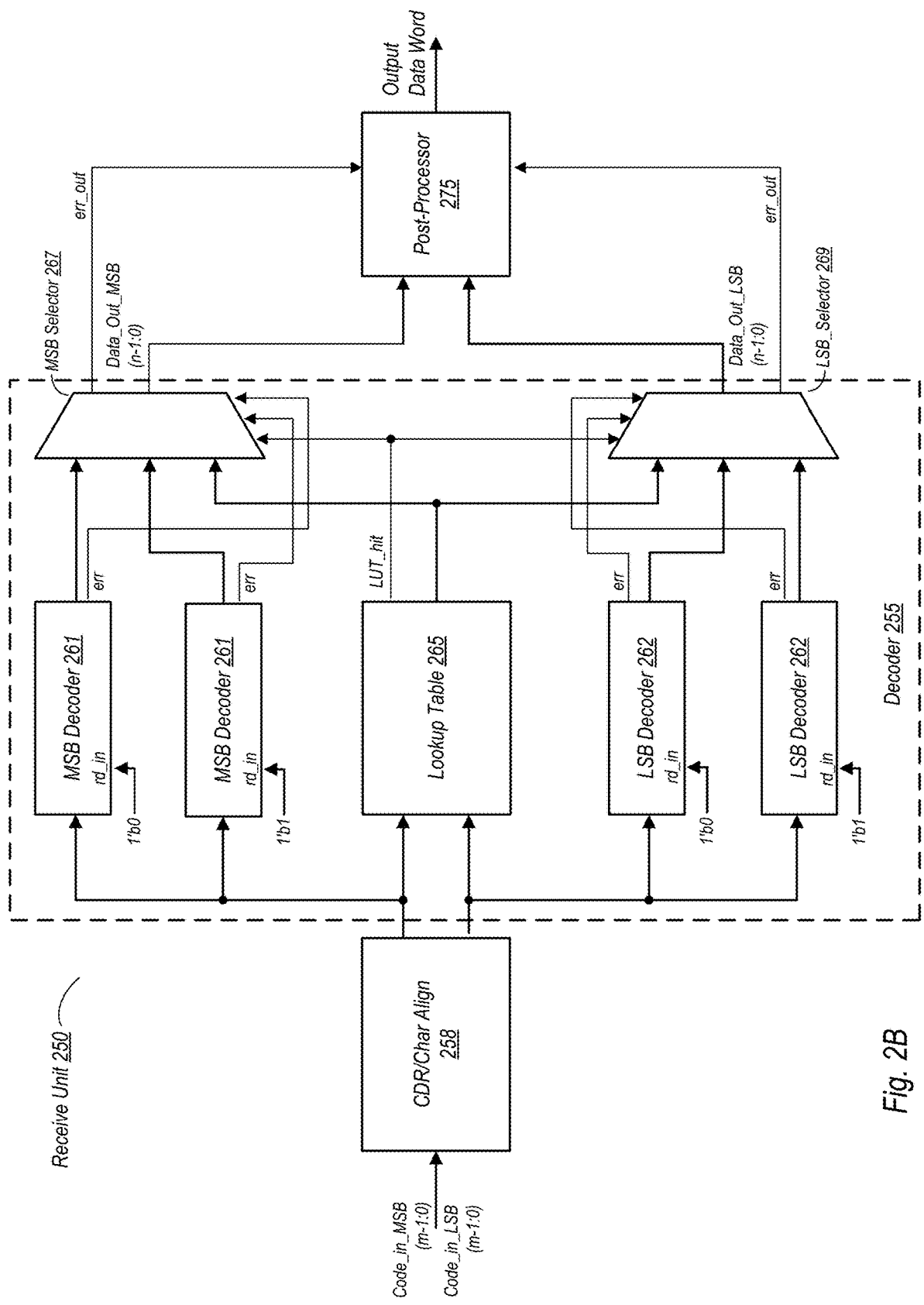
FIG. 2B is a block diagram of one embodiment of a receiver circuit.

FIG. 2B is a block diagram of one embodiment of a receiver that may be utilized in a communication system along with the transmitter of FIG. 2A. In the embodiment shown, receive unit 250 includes a CDR/character alignment circuit 258, a decoder 255, and a post-processor 275. Incoming data is received by the CDR/character alignment circuit 258, passed to the decoder 255, and subsequently to post processor 275.

CDR/character alignment circuit 258 includes circuitry for receiving the incoming data comprising the bits of Code_in_MSB and Code_in_LSB. Clock recovery circuits within CDR/character alignment circuit 258 recover a clock signal embedded within the data. The circuitry may also include decision feedback equalization (DFE) circuitry for slicing the voltage of incoming signals to determine the value of each symbol. CDR/character alignment circuit 258 may also include circuitry for separating the most significant bits from the least significant bits of a received data word, and may also include deserialization circuitry for converting serially received data into a parallel format.

Decoder 255 in the embodiment shown includes a lookup table 265, MSB decoders 261, and LSB decoders 262. Lookup table 265 includes logic circuitry configured to detect in the incoming data words the substitute codes that may be provided by the corresponding lookup table 215 implemented in transmit unit 200 of FIG. 2A. Additionally, lookup table 265 also includes storage circuitry for storing data words that would otherwise cause, when encoded in transmit unit 200, a code that does not include a symmetric transition. For example, lookup table 265 in the embodiment shown stores the same data words that, when detected by lookup table 215 of transmit unit 200 of FIG. 2A, cause a lookup table hit and corresponding substitute code to be provided. Thus, when the logic circuitry of lookup table 265 detects an incoming code that corresponds to one of the stored data words, the resultant hit causes both assertion of the LUT hit signal as well as providing the corresponding data word as an output. In this particular embodiment, the MSB symbol may be used to select the ordering of the two bytes selected from lookup table 265, with the byte containing the most significant bits being provided to the MSB selector 267 and the byte containing the least significant bits provided to the LSB selector 269. The LUT hit signal is provided as a selection signal to MSB selector 267 and LSB selector 269, causing their respective bytes of data to be selected for output to post-processor 275.

In the absence of a hit in lookup table 265, the output data is provided by a pair of the decoders, one MSB decoder 261 and one LSB decoder 262. Similar to the encoders discussed above with reference to FIG. 2A, each of the decoders 261 and 262 in the embodiment shown includes a running disparity input that is either tied high (1'b1) or low (1'b0). Additionally, each of these decoders is configured to generate an error output (err). MSB selector 267 and LSB selector 269 use these error outputs to determine which bytes to select from the decoders. In one embodiment, an error may be triggered by a particular decoder if the decoded character is unbalanced.

Selecting data from the decoders may be performed as follows. For a given pair of decoders, if one asserts an error signal while the other does not, the corresponding selector selects the byte from the decoder that is error free (no error signal asserted). For example, if a first MSB decoder 267 asserts an error signal while a second MSB decoder 267 does not, MSB selector 267 selects the byte from the latter of these two. If, in the event that neither of a pair of decoders asserts an error signal and their respective output data is the same, the corresponding selector can choose output data from either one. For example, neither of LSB decoders 262 assert an error signal, LSB selector 269 may select data from either one. If neither of the decoders asserts an error signal, but the output data does not match, the corresponding selector circuit flags an error by asserting its corresponding err_out signal, which is received by post-processor 275. The corresponding selector also flags an error of both of its corresponding decoders assert their respective error signals.

Post processor 275 in the embodiment shown is coupled to receive the MSB output data (Data_out_MSB n−1:0) and the LSB output data (Data_Out_LSB n−1:0). Post-processor 275 may perform various functions such as formatting the received data and/or performing some conversion thereon to prepare for its use by additional circuitry in which the communications system is implemented. Post processor 275 may include a number of different types of circuits, including registers, various logic circuits for formatting and/or shifting the data, buffers for temporary storage of data, and so forth.

Figure 2C:
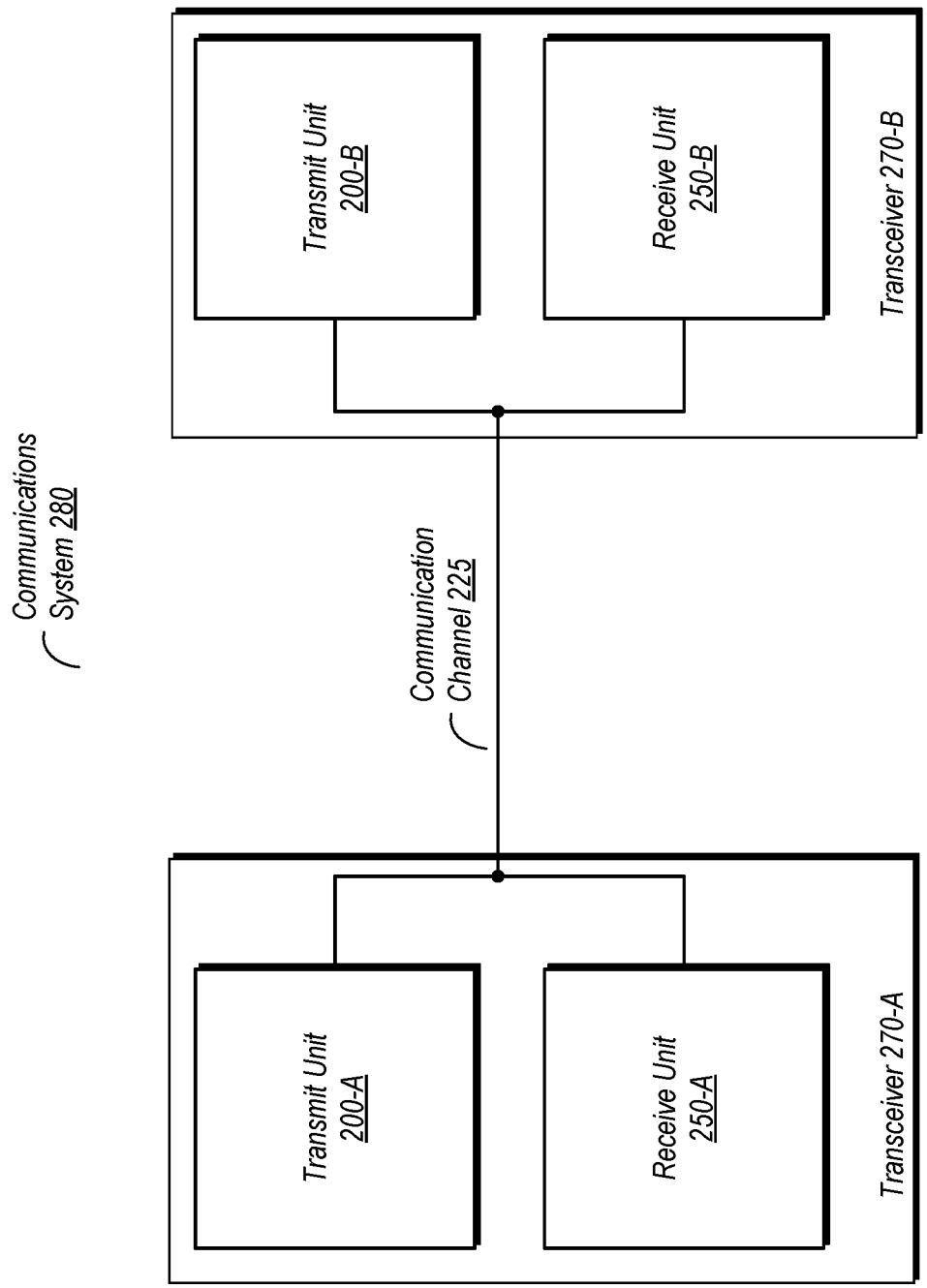
FIG. 2C is a block diagram of one embodiment of a communications system including multiple transmitter and receiver circuits.

FIG. 2C is a block diagram of a communications system. In the embodiment shown, communications system 280 is a bi-direction communications system that includes a link over communication channel 225. A first transceiver 270-A includes a first transmit unit 200-A and a first receive unit 250-A. A second transceiver 270-B includes a second transmit unit 200-B and a second receive unit 250-B. The respective transmit and receive units may be embodiments of those discussed above with reference to FIGS. 2A and 2B. The communications system 270 may also include other components (e.g., transmit/receive switches) that are not shown here for the sake of simplicity.

In some embodiments, the entirety of communications system 270 may be implemented within a single, larger system, such as a table computer, a smartphone, or other type of device. In other embodiments, a portion of communications system 270 may be implemented on one device (e.g., a computer system) while the other portion may be implemented on another device (e.g., a peripheral device), with these devices not always being connected to one another. For example, channel 225 may be a peripheral cable used to connect a first device to a second device, with the ability for a user to disconnect the devices when the services of one another are not required or desired.

Figure 3:
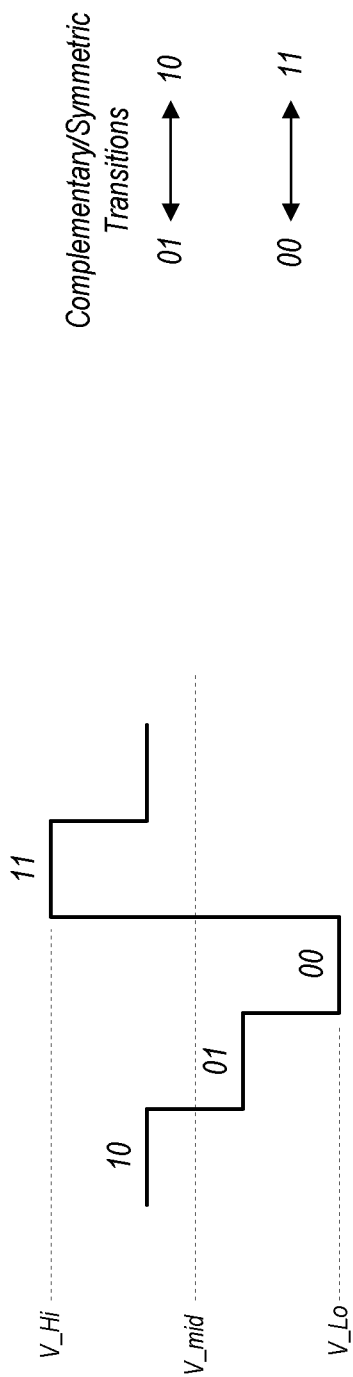
FIG. 3 is a diagram illustrating aspects of signal transmission in one embodiment of a communications circuit.

FIG. 3 is a diagram illustrating aspects of signal transmission in one embodiment of a communications circuit. As noted above, embodiments of the transmitters and receivers disclosed herein may utilize PAM4 signaling (although the disclosure is not limited in this manner). The left-hand portion of the diagram illustrates a PAM4 signal, with four different voltage levels. Each of the voltage levels represents a single, two-bit digital value/symbol. The highest voltage value here is V_Hi, at which the symbol is a 11, while the lowest voltage, V_Lo, corresponds to a symbol value of 00. The symbol values of 10 and 01 occur at voltage levels that are equal in magnitude but opposite in direction from the midpoint voltage, V_mid.

Since bits can be transmitted in any sequence, transitions in a PAM4 signal may occur between any two of the voltage levels shown. However, as shown on the right-hand portion of the diagram, a symmetrical transition for this particular signaling scheme comprises either a transition between 01 and 10 (in either direction) or between 00 and 11 (also in either direction).

More generally, a symmetrical transition as defined herein is a transition between two voltage levels that crosses the midpoint voltage (V_mid) and in which the start and end voltages are of equal magnitude away from the midpoint voltage. Thus, while a transition from the voltage level of 00 to 11 results in a symmetrical transition, a transition from 10 to 00 does not result in a symmetrical transition since the voltage level corresponding to the former is closer to the midpoint voltage than the latter. Similarly, a transition from 10 to 11 does not result in a symmetric transition, as it does not cross the midpoint voltage during the transition from one voltage value to the other. Thus, per the discussion above, the encoding schemes disclosed herein are provided to ensure that sequences of bits transmitted over the communications channel include at least some symmetric transitions to enable clock recovery at the receiver.

It is noted that the number of bits in the data words and encodings as discussed above is provided by way of example, but is not intended to limit the disclosure. On the contrary, the circuits implementing transmit unit 200 and receive unit 250 may be configured in different arrangements to handle different sized data words and respective encodings thereof.

Figure 4:
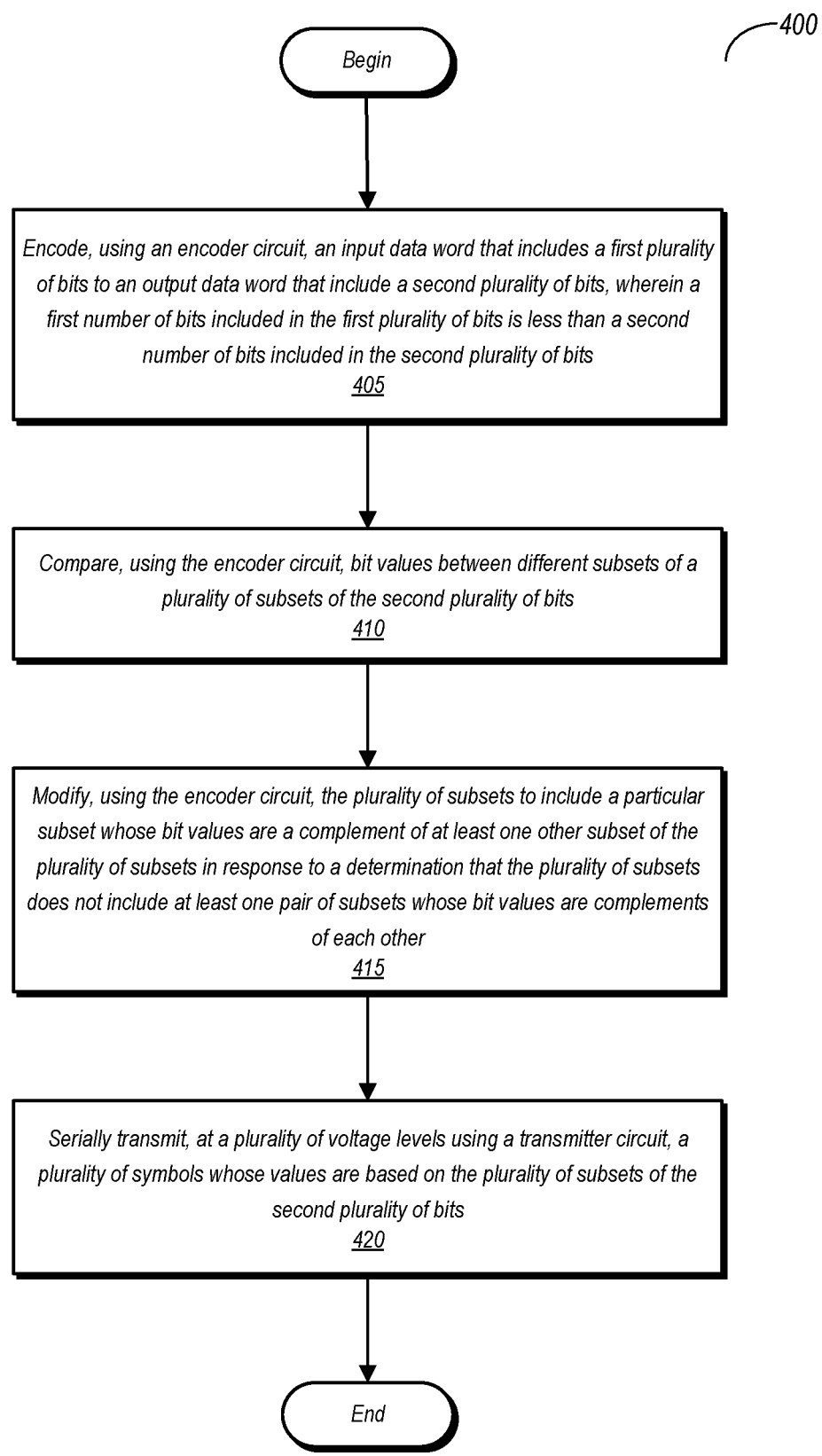
FIG. 4 is a flow diagram of one embodiment of a method for operating a communications system.

Methods of Operation:

FIG. 4 is a flow diagram of one embodiment of a method for operating a communications system. Method 400 as shown in FIG. 4 may be performed with any of the embodiment of a transmitter/transmit unit as discussed above. Furthermore, embodiments of an apparatus capable of carrying out Method 400, but not otherwise disclosed herein, are also considered to fall within the scope of this disclosure.

Method 400 includes encoding, using an encoder circuit, an input data word that includes a first plurality of bits to an output data word that include a second plurality of bits, wherein a first number of bits included in the first plurality of bits is less than a second number of bits included in the second plurality of bits (block 405). The method further includes comparing, using the encoder circuit, bit values between different subsets of a plurality of subsets of the second plurality of bits (block 410). Thereafter, the method includes modifying, using the encoder circuit, the plurality of subsets to include a particular subset whose bit values are a complement of at least one other subset of the plurality of subsets in response to a determination that the plurality of subsets does not include at least one pair of subsets whose bit values are complements of each other (block 415). After modifying, the method continues by serially transmitting, at a plurality of voltage levels using a transmitter circuit, a plurality of symbols whose values are based on the plurality of subsets of the second plurality of bits (block 420).

In various embodiments, the method includes a transition checker circuit selecting the plurality of symbols to be transmitted from a plurality of encoders of the encoding circuit, the plurality of encoders including first and second most significant bit (MSB) encoders and first and second least significant bit (LSB) encoders. With regard to the encoding, the method includes generating, using the first and second MSB encoders and first and second MSB encodings, respectively, of the input data word, the first and second MSB encodings having different disparities with respect to one another, and generating, using the first and second LSB encoders, first and second LSB encodings, respectively, of the input data word, the first and second LSB encodings having different disparities with respect to one another. It is noted, as shown in, e.g., FIG. 2, both encoders of a set (e.g., both MSB encoders) perform encoding on the same set of most significant bits, with the difference being that one decoder has an input, rd_in, tied low (e.g., logic 0) while the other has an rd_in input that is tied high (e.g., logic 1). These may be alternately referred to as the "rd-high" and "rd-low" MSB encoders. Similarly, both LSB encoders perform encoding on the same set of least significant bits, one having rd_in tied low and the other having rd_in tied high. These encoders may also be referred to as the "rd-high" and "rd-low" LSB encoders.

In various embodiments, the plurality of encoders includes a lookup table. In such embodiments, the method further comprises the transition checker circuit selecting the plurality of symbols from the lookup table in response to determining that the input data word is one of a plurality of input words that do not include a complementary transition.

In various embodiments, the method further includes, receiving, at a receiver circuit via a communications channel, the plurality of symbols transmitted by the transmitter, and recovering, using a clock-and-data recovery (CDR) circuit, the plurality of symbols and an embedded clock signal. Based on the recovered symbols, the method includes generating an output data word, wherein generating the output data word comprises decoding the plurality of symbols using a decoder circuit.

Figure 5:
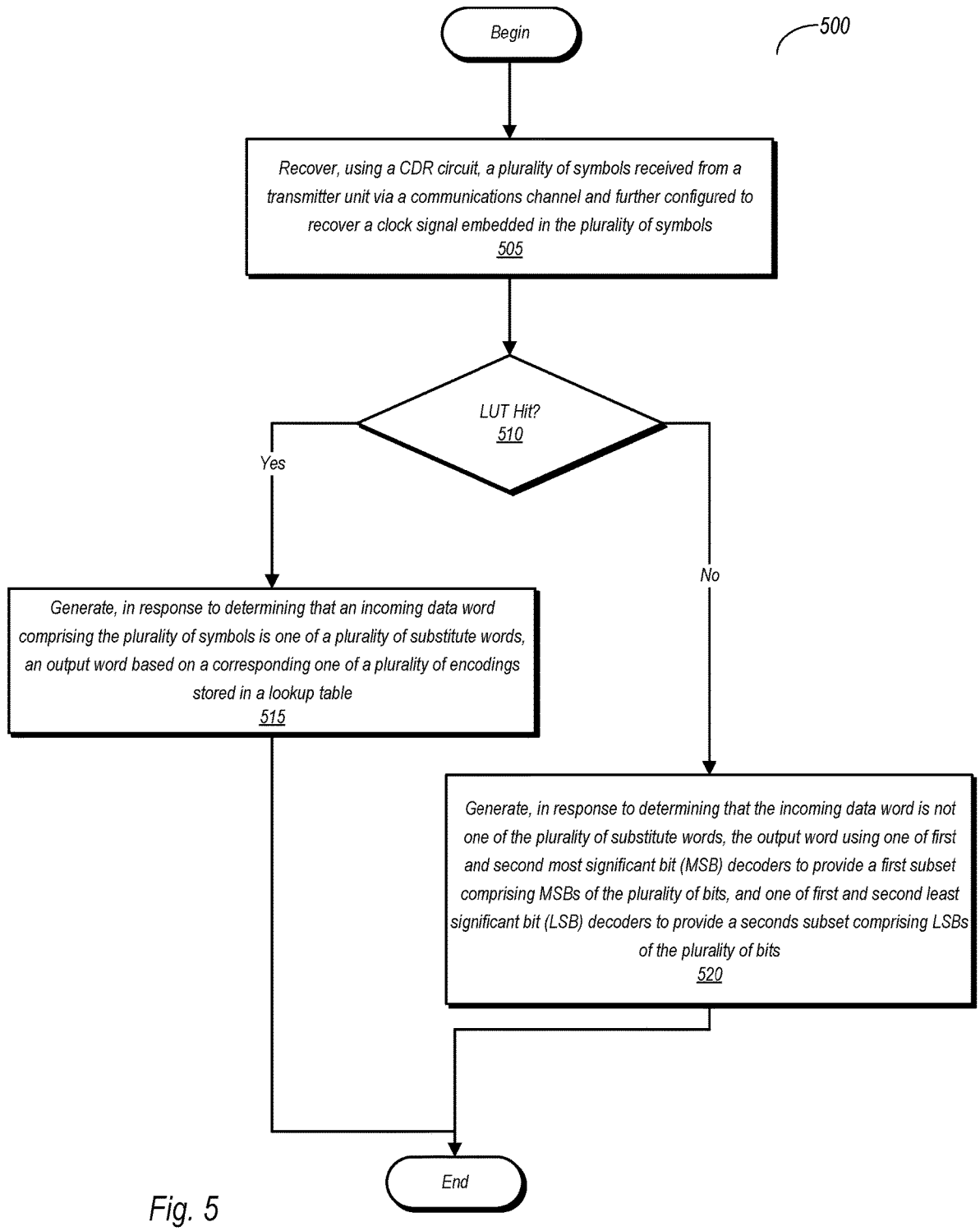
FIG. 5 is a flow diagram of one embodiment of a method for operating a communications system.

FIG. 5 is a diagram of another embodiment of a method for operating a communications system. Method 500 may be carried out by various embodiments of a receiver and in a communications system as discussed above. Apparatus embodiments capable of carrying out Method 500 but not otherwise disclosed here are also considered to fall within the scope of this disclosure.

Method 500 includes recovering, using a CDR circuit, a plurality of symbols received from a transmitter unit via a communications channel and further configured to recover a clock signal embedded in the plurality of symbols (block 505). The clock signal may be recovered based on symmetric transitions in the signal carrying the symbols, as discussed above. Recovering the symbols may include performing decision feedback equalization to reduce inter-symbol interference.

After the symbols have been recovered and aligned, they are conveyed to decoder circuitry that includes a lookup table. The lookup table includes logic configured to detect certain encodings that are substitute encodings provided from another lookup table in a transmitter. The substitute encodings are provided from the lookup table on the transmitter side of the link when an encoding of certain data words does not result in a symmetric transition (or a sufficient number thereof). These encodings may then be detected on the receiver side of the link to enable recovery of the original data words. If such an encoding is detected, the logic in the lookup table indicates a hit. If a hit is detected (block 510, yes), the method proceeds to generating, in response to determining that an incoming data word comprising the plurality of symbols is one of a plurality of substitute words, an output word based on a corresponding one of a plurality of encodings stored in a lookup table (block 515). However, if no hit is detected in the lookup table (block 510, no), Method 500 thus includes generating, in response to determining that the incoming data word is not one of the plurality of substitute words, the output word using one of first and second most significant bit (MSB) decoders to provide a first subset comprising MSBs of the plurality of bits, and one of first and second least significant bit (LSB) decoders to provide a second subset comprising LSBs of the plurality of bits (block 520).

Figure 6:
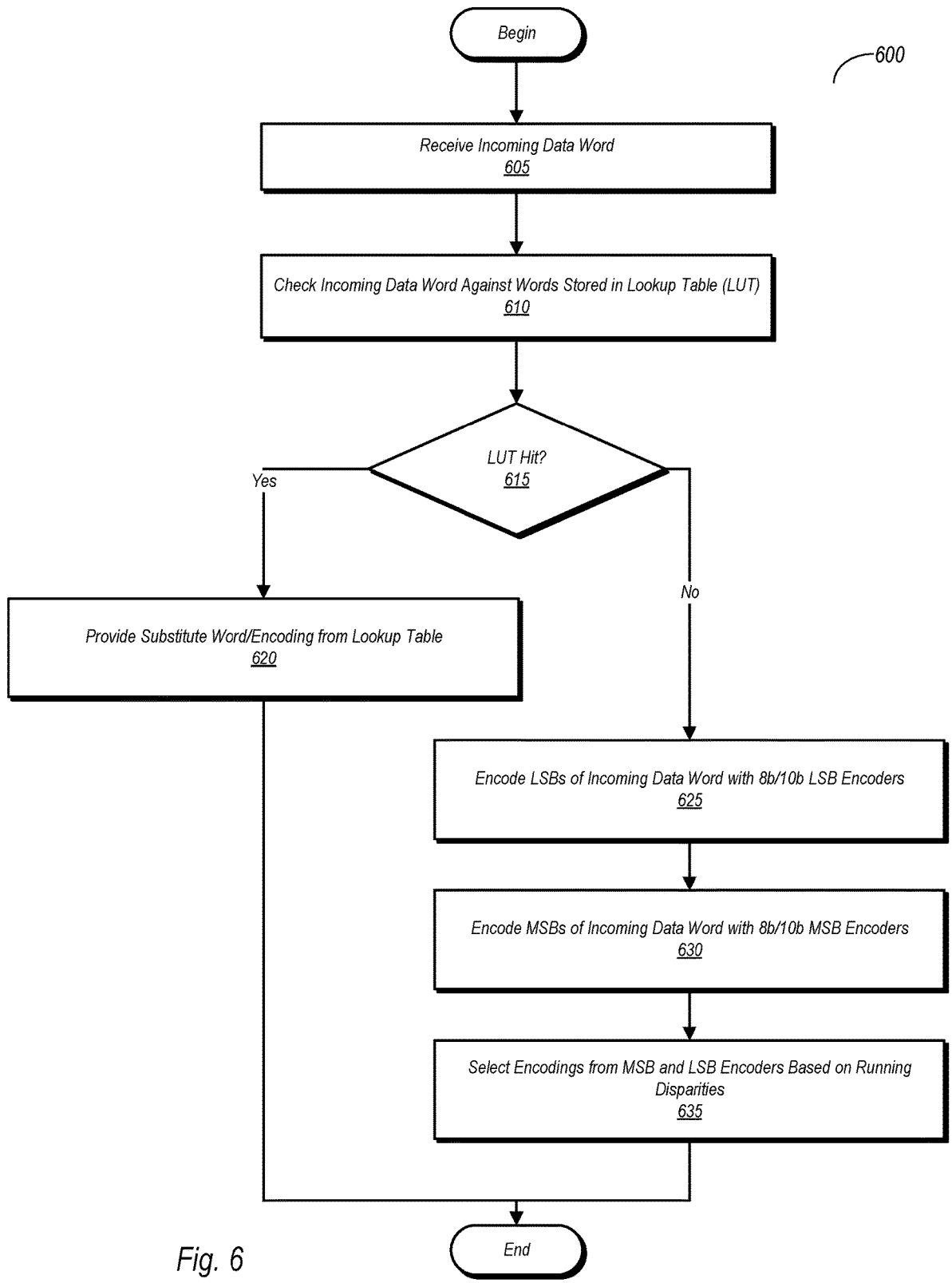
FIG. 6 is a flow diagram of one embodiment of a method for operating a communications system.

FIG. 6 is a flow diagram of one embodiment of a method for operating a communications system. Method 600 in the embodiment shown focuses on the transmit side, and may thus be carried out by various embodiments of the transmit units discussed above. Apparatus embodiments capable of carrying out Method 600 that are otherwise not explicitly disclosed herein are also considered to fall within the scope of this disclosure.

Method 600 includes receiving an incoming data word (block 605) and checking the incoming data word against words stored in a lookup table (block 610). The words stored in the lookup table may be those words that, even when encoded using schemes such as 8b/10b, still fail to produce a symmetric transition or a sufficient number thereof to enable clock recovery at a receiver. In some embodiments, words may be broken into bytes. For example, in the embodiment of Method 600 discussed here, the words are 16-bit words that include a first byte of most significant bits (MSBs) and a second byte of least significant bits (LSBs). However, it is noted that Method 600 as disclosed here may be varied in accordance with the number of bits and organization of the data words to be transmitted. Similarly, although the discussion of Method 600 includes a particular type of encoding, embodiments of the method using different types of encoding schemes are possible and contemplated.

If the incoming data word, when checked by logic in the lookup table, results in a hit (block 615, yes), then a substitute word/encoding is provided from the lookup table (block 620). For example, if either the MSB byte or LSB byte of an incoming data word is one that does not result in at least one symmetrical transition when 8b/10b encoding is applied, a substitute encoding may be applied that does include a symmetrical transition. This encoding may allow clock and data recovery on the receiver end of the communications link, and may further allow recovery of the original data word through the use of another lookup table. In some embodiments, even when only one byte (MSB or LSB) includes a word having a pattern of bits that results in a lookup table hit, both the MSB and LSB may be provided substitute encodings stored in the lookup table, such as in the example discussed above with reference to FIG. 2A. However, this use of the lookup table to generate substitute encodings is not intended to be limiting, and thus numerous other embodiments are possible and contemplated.

If the incoming data word does not result in a lookup table hit (block 615, no), encoding is then performed by the various encoder circuits of the transmit unit. In the embodiment shown, this includes encoding the LSBs of the incoming data word with 8b/10b LSB encoders (block 625), as well as encoding the MSBs of the incoming data word with 8b/10b MSB encoders (block 630). In embodiments such as that shown in FIG. 2A, there may be multiple MSB and LSB encoders, each of which is arranged to adjust the running disparity of the encoded string of bits in a particular direction. Based on the resulting running disparities of their respective encodings, particular encodings are selected from the MSB and LSB encoders (block 635). In one embodiment, a combination of encodings from the MSB and LSB encoders is selected such that their combined running disparity is at or as close to zero relative to other possible encoding combinations. After the encodings have been selected, they may be transmitted on a communications channel. In one embodiment, code may be transmitted serially.

Figure 7:
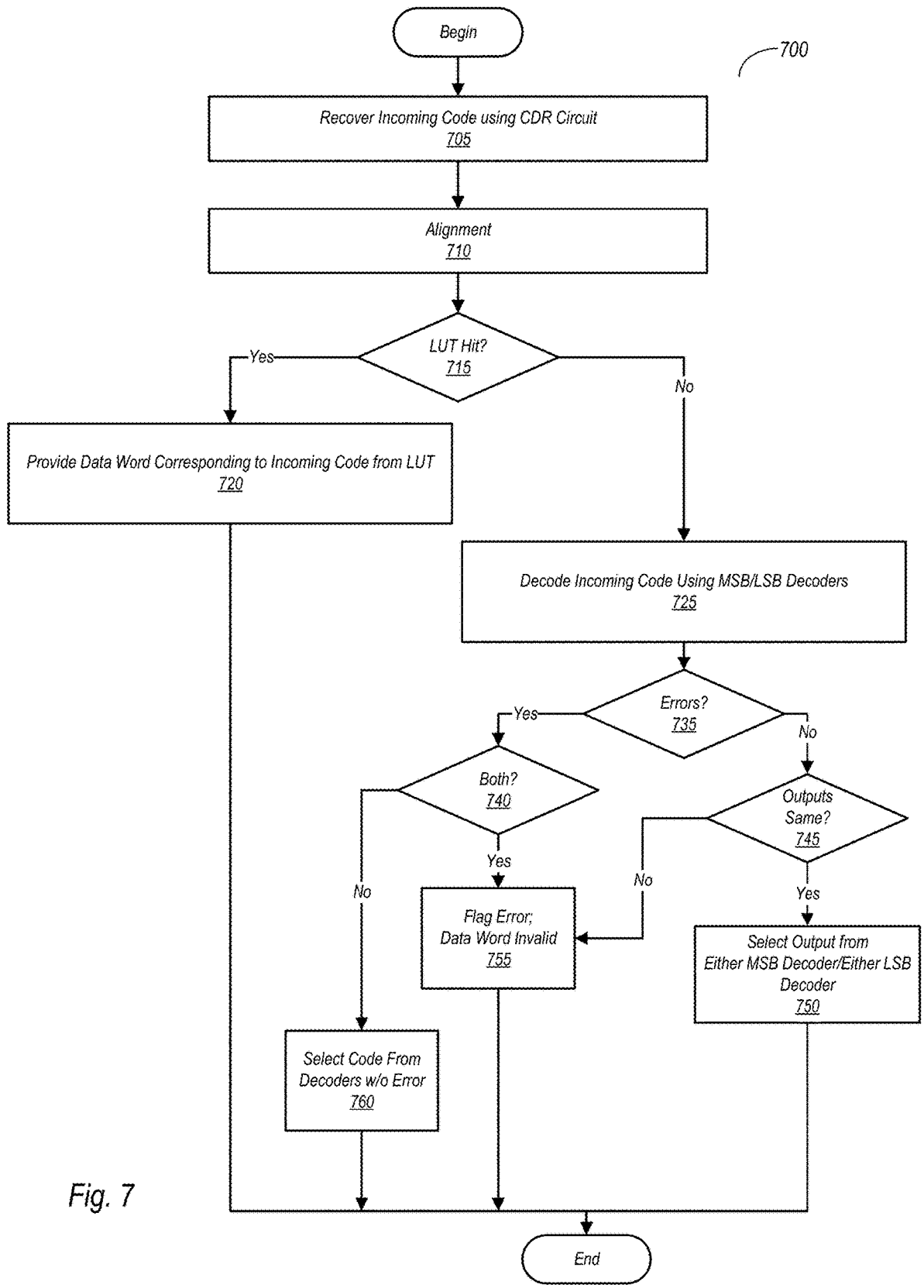
FIG. 7 is a flow diagram of one embodiment of a method for operating a communications system.

FIG. 7 is a flow diagram of one embodiment of a method for operating a communications system. Method 700 in the embodiment shown focuses on the receiver side of a communications system, and may thus be carried out by various embodiments of the receive units discussed above, such as in FIG. 2B. Apparatus embodiments capable of carrying out Method 700 that are otherwise not explicitly disclosed herein are also considered to fall within the scope of this disclosure.

Method 700 begins with the recovery of incoming codes using a CDR circuit (block 705). The incoming codes in one embodiment are data words encoded using 8b/10b encoding, although embodiments that work with other types of encodings are possible and contemplated. In various embodiments, these codes are serially transmitted to the receiver. After recovering the incoming codes, alignment is performed (block 710) to, e.g., present the codes in the proper order. After alignment, the codes are presented to a lookup table.

At the lookup table, logic therein determines whether the incoming code is one of a number of encodings that are substitutes for words that do not otherwise produce a symmetrical transition when encoding, as discussed above. If the logic detects one of these code, a lookup table hit is indicated. If the lookup table indicates a hit (block 715, yes), the lookup table outputs a data word corresponding to the incoming code that caused the hit (block 720). The data word may then be output to, e.g., a post processor for further processing.

If the incoming code does not trigger a lookup table hit (block 715, no), decoding may be conducted using MSB and LSB decoders (block 725). It is noted that the method steps following block 725 may be performed separately and independently for LSB decoders and the MSB decoders, although these same operations are performed for both groups concurrently in this embodiment. If a particular group of decoders detects error(s) (block 735, yes), then a determination is made to whether both of the decoders detected an error. If one of the decoders detects an error but the other decoder does not (block 740, no), the output data is selected from a decoder that did not detect an error (block 760). However, if all of the decoders of a group detect an error (block 740, yes), the data word is considered invalid (block 755).

If no errors are detected (block 735, no), and the output data from the decoders of a particular group is the same (block 745, yes), then the output data can be selected from any of the decoders (block 750). However, if the output data is not the same for the decoders of the particular group (block 745, no), then an error is flagged and the data word is marked invalid (block 755).

To illustrate the above by way of example, consider the embodiment of FIG. 2B. If an error is indicated from one of the LSB decoders 262 but not the other, the LSB portion of the data word is taken from the one of the LSB decoders 262 that did not assert an error signal. However, if both LSB decoders 262 assert an error signal, then the data word is determined to be invalid and an error is flagged. If neither of the LSB decoders 262 asserts an error signal, and their respective data outputs are equivalent, then the LSB portion of the data word can be taken from either of the LSB decoders. However, if the output data between the two LSB decoders 262 does not match despite there being no error, the data word is flagged as being invalid and in error. This same operation may apply to the MSB decoders 261 as well.

Figure 8:
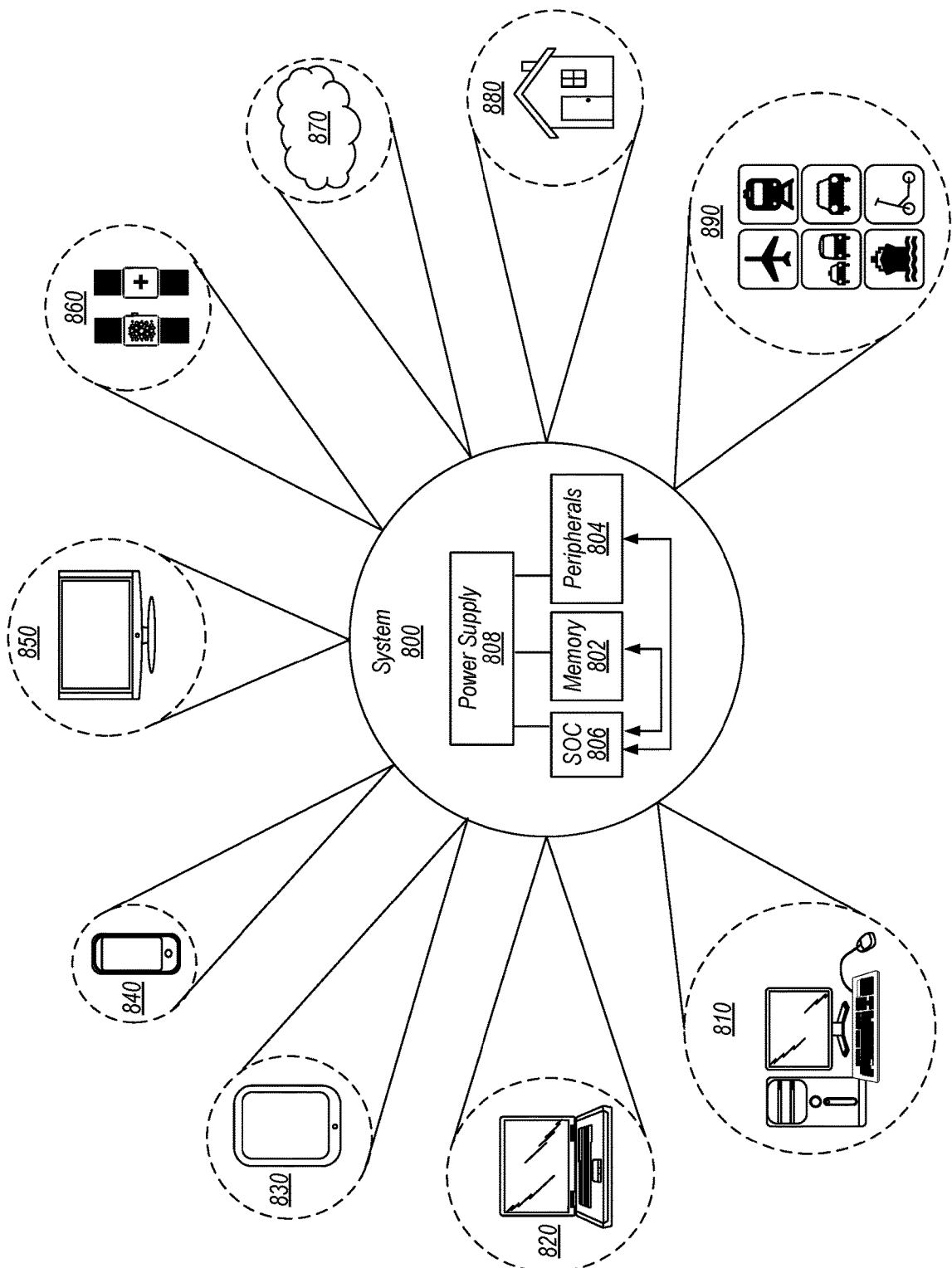
FIG. 8 is a block diagram of one embodiment of an example system.

Example System:

Turning next to FIG. 8, a block diagram of one embodiment of a system 800 is shown that may incorporate and/or otherwise utilize the methods and mechanisms described herein. In the illustrated embodiment, the system 800 includes at least one instance of a system on chip (SoC) 806 which may include multiple types of processing units, such as a central processing unit (CPU), a graphics processing unit (GPU), or otherwise, a communication fabric, and interfaces to memories and input/output devices. In some embodiments, one or more processors in SoC 806 includes multiple execution lanes and an instruction issue queue. In various embodiments, SoC 806 is coupled to external memory 802, peripherals 804, and power supply 808.

A power supply 808 is also provided which supplies the supply voltages to SoC 806 as well as one or more supply voltages to the memory 802 and/or the peripherals 804. In various embodiments, power supply 808 represents a battery (e.g., a rechargeable battery in a smart phone, laptop or tablet computer, or other device). In some embodiments, more than one instance of SoC 806 is included (and more than one external memory 802 is included as well).

The memory 802 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

SoC 806 in the embodiment shown may include, in full or in part, a communications system in accordance with the discussion above from FIGS. 1-7. For example, SoC 806 may include an embodiment of the transmit unit 100 of FIG. 1A, the receive unit 150 of FIG. 1B, a transceiver that includes both of these units, and/or a full communications system that includes a bidirectional link with transmit and receive units on both sides of the link. Such circuitry may include the various encoders, decoders, and other circuit units described above, and may operate in accordance with embodiments of the various methods also discussed above. It is further noted that other portions of a system (e.g., wholly or partly outside of SoC 806) may implement a communications system and/or portions thereof in accordance with the discussion above.

The peripherals 804 include any desired circuitry, depending on the type of system 800. For example, in one embodiment, peripherals 804 includes devices for various types of wireless communication, such as Wi-Fi, Bluetooth, cellular, global positioning system, etc. In some embodiments, the peripherals 804 also include additional storage, including RAM storage, solid state storage, or disk storage. The peripherals 804 include user interface devices such as a display screen, including touch display screens or multi-touch display screens, keyboard or other input devices, microphones, speakers, etc.

As illustrated, system 800 is shown to have application in a wide range of areas. For example, system 800 may be utilized as part of the chips, circuitry, components, etc., of a desktop computer 810, laptop computer 820, tablet computer 830, cellular or mobile phone 840, or television 850 (or set-top box coupled to a television). Also illustrated is a smartwatch and health monitoring device 860. In some embodiments, smartwatch 860 may include a variety of general-purpose computing related functions. For example, smartwatch 860 may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 800 may further be used as part of a cloud-based service(s) 870. For example, the previously mentioned devices, and/or other devices, may access computing resources in the cloud (i.e., remotely located hardware and/or software resources). Still further, system 800 may be utilized in one or more devices of a home 880 other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 8 is the application of system 800 to various modes of transportation 890. For example, system 800 may be used in the control and/or entertainment systems of aircraft, trains, buses, cars for hire, private automobiles, waterborne vessels from private boats to cruise liners, scooters (for rent or owned), and so on. In various cases, system 800 may be used to provide automated guidance (e.g., self-driving vehicles), general systems control, and otherwise. These any many other embodiments are possible and are contemplated. It is noted that the devices and applications illustrated in FIG. 8 are illustrative only and are not intended to be limiting. Other devices are possible and are contemplated.

It is noted that while the circuits discussed above have been implemented using NMOS and PMOS transistors, the disclosure is not intended to limit embodiments falling within its scope to these types of devices. Thus, in addition to various MOSFET types discussed above, the present disclosure also contemplates embodiments that use non-planar devices such as FinFETs, GAAFETs (Gate All Around FETs), among other types. Embodiments implemented using Bipolar devices are also possible and contemplated. The disclosure further contemplates that technologies that are speculative as of this writing may be used to implement devices in various embodiments of the circuits discussed herein. These technologies include (but are not limited to) graphene transistors, carbon nanotube transistors, gallium arsenide transistors, and so on. The use of memristors in certain circuit structures is also contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus comprising:
    an encoder circuit configured to:
        encode an input data word, having n bits, into respective first and second output data words, each having m bits, wherein m is greater than n, and wherein each of the first and second output data words include a respective first subset of bits and a respective second subset of bits;
        identify one of the first subsets of bits that is a complement to one of the second subsets of bits; and
        select the identified first and second subsets of bits to form a transmit data word; and
    a transmitter circuit configured to serially transmit, using a plurality of voltage levels, a plurality of symbols whose values are based on the transmit data word.

2. The apparatus of claim 1, wherein, to encode the input data word, the encoder circuit includes:
    first and second most significant bit (MSB) encoders configured to generate the respective first subsets of bits corresponding to a group of MSBs of the input data word; and
    first and second least significant bit (LSB) encoders configured to generate the respective second subsets of bits corresponding to a group of LSBs of the input data word.

3. The apparatus of claim 2, wherein the encoder circuit further comprises a lookup table configured to:
    concurrent with the encode of the input data word by the encoder circuit, compare the input data word to a plurality of substitute data words; and
    based on a determination that the lookup table includes a substitute data word corresponding to the input data word, provide the corresponding substitute data word for use as the transmit data word;
    wherein the plurality of substitute data words corresponds to a plurality of input words that do not include a pair of complementary subsets of bits when encoded by the encoder circuit.

4. The apparatus of claim 3, wherein the encoder circuit further comprises a transition checker circuit configured to select the transmit data word from among the first and second MSB encoders and the first and second LSB encoders, or from the lookup table.

5. The apparatus of claim 2, wherein the first and second MSB encoders are configured to generate encodings having different disparities with respect to one another and wherein the first and second LSB encoders are configured to generate encodings having different disparities with respect to one another.

6. The apparatus of claim 1, wherein each of the plurality of symbols include two or more bits.

7. The apparatus of claim 6, wherein the transmitter circuit is configured to transmit the plurality of symbols using pulse amplitude modulation signals with four voltage levels (PAM4).

8. The apparatus of claim 1, further comprising a receiver circuit configured to receive the plurality of symbols from the transmitter circuit via a communications channel, wherein the receiver circuit includes a decoder circuit and a clock-and-data-recovery (CDR) circuit configured to recover a clock signal embedded in the plurality of symbols.

9. The apparatus of claim 8, wherein the decoder circuit includes:
    first and second most significant bit (MSB) decoders configured to decode a first subset of the plurality of symbols, wherein the first MSB decoder is configured to decode the first subset of symbols into a first group of MSBs of the transmit data word, and the second MSB decoder is configured to decode the first subset of symbols into a second group of MSBs of the transmit data word; and
    first and second least significant bit (LSB) decoders configured to decode a second subset of the plurality of symbols, wherein the first LSB decoder is configured to decode the second subset of symbols into a first group of LSBs of the transmit data word, and the second LSB decoder is configured to decode the second subset of symbols into a second group of LSBs of the transmit data word.

10. The apparatus of claim 8, wherein the decoder circuit includes a look-up table configured to, in response to determining that the plurality of symbols include one of a plurality of substitute words, provide a corresponding original word as an output data word, and wherein decoder circuit is further configured to provide the output data word from ones of the first and second MSB decoders and first and second LSB decoders if the plurality of symbols does not include any of the plurality of substitute words.

11. A method comprising:
    encoding, by an encoder circuit, an input data word having n bits, into respective first and second output data words having m bits, wherein m is greater than n, and wherein:
        the first output data word includes first and second subsets of bits; and
        the second output data word includes third and fourth subsets of bits;
    identifying, by the encoder circuit, one of either the first or third subsets of bits that is a complement of one of either the second or fourth subsets of bits;
    generating, by the encoder circuit, a transmit data word from the complimentary subsets of bits; and
    serially transmitting, by a transmitter circuit, a plurality of symbols whose values are based on the transmit data word.

12. The method of claim 11, wherein generating the transmit data word includes selecting, by a transition checker included in the encoder circuit, the complimentary subsets of bits from a plurality of encoders included in the encoder circuit, the plurality of encoders including first and second most significant bit (MSB) encoders and first and second least significant bit (LSB) encoders.

13. The method of claim 12, further comprising:
generating, using the first and second MSB encoders, respective first and second MSB encodings, wherein the first MSB encoding corresponds to the first subset of bits, and the second MSB encoding corresponds to the third subset of bits, and wherein the first and second MSB encodings having different disparities with respect to one another; and
generating, using the first and second LSB encoders, respective first and second LSB encodings, wherein the first LSB encoding corresponds to the second subset of bits, and the second LSB encoding corresponds to the fourth subset of bits, and wherein the first and second LSB encodings having different disparities with respect to one another.

14. The method of claim 12, wherein the encoder circuit includes a lookup table, and wherein the method further comprises:
selecting, by the transition checker, the transmit data word from the lookup table in response to determining that the input data word is one of a plurality of input words that do not include a complementary transition when encoded by the plurality of encoders.

15. The method of claim 11, further comprising:
receiving, at a receiver circuit via a communications channel, the plurality of symbols transmitted by the transmitter circuit;
recovering, using a clock-and-data recovery (CDR) circuit in the receiver circuit, the plurality of symbols and an embedded clock signal; and
generating an output data word, corresponding to the input data word, wherein generating the output data word comprises decoding the plurality of symbols using a decoder circuit.

16. An apparatus comprising:
a clock-and-data-recovery (CDR) circuit configured to:
recover a plurality of symbols received from a transmitter unit via a communications channel and further configured to recover a clock signal embedded in the plurality of symbols; and
a decoder circuit that includes a lookup table, first and second most significant bit (MSB) decoders, and first and second least significant bit (LSB) decoders, and is configured to provide an output word, based on the plurality of symbols, the output word having a plurality of bits, wherein the decoder circuit is further configured to:
in response to determining that an incoming data word comprising the plurality of symbols is one of a plurality of substitute words, generate the output word based on a corresponding one of a plurality of encodings stored in the lookup table; and
in response to determining that the incoming data word is not one of the plurality of substitute words, generate an output data word using one of the first and second MSB decoders to provide a first subset comprising MSBs of the plurality of bits, and one of first and second LSB decoders to provide a second subset comprising LSBs of the plurality of bits.

17. The apparatus of claim 16, wherein the decoder circuit is configured to, in response to determining that the incoming data word is not one of the plurality of substitute words, generate the output word based on determining if either of the first and second MSB decoders and either of the first and second LSB decoders has generated an error signal.

18. The apparatus of claim 17, wherein the decoder circuit includes a first selection circuit configured to select MSBs of the plurality of bits from one of the first and second MSB decoders and the lookup table, and further comprising a second selection circuit configured to select LSBs of the plurality of bits from one of the first and second LSB decoders and the lookup table.

19. The apparatus of claim 16, further comprising a character alignment circuit configured to perform an alignment operation of the plurality of symbols, wherein the character alignment circuit is configured to, subsequent to performing the alignment operation, provide the incoming data word to the lookup table, the first and second MSB decoders, and the first and second LSB decoders.

20. The apparatus of claim 16, wherein apparatus further comprises the transmitter unit, wherein the transmitter unit includes:
an encoder circuit configured to:
encode an input data word having a first number of bits into a first data word having a second number of bits greater than the first number of bits;
encode the input data word into a second data word having the second number of bits;
concurrent with the encode of the input data word into the first and second data words, compare the input data word to one or more substitute transmit words of a plurality of substitute transmit words in a table;
in response to a determination that the input data word corresponds to one of the plurality of substitute transmit words in the table, select the corresponding substitute transmit word as a transmit data word; and
in response to a determination that the input data word does not correspond to one of the plurality of substitute transmit words in the table:
determine whether the first data word or the second data word includes at least one pair of bit subsets that are complements of each other;
select, based on the determination, either the first data word or the second data word as the transmit data word; and
a transmitter circuit configured to transmit the transmit data word onto the communications channel.

* * * * *